United States Patent
Ryoo

Patent Number: 6,061,427
Date of Patent: May 9, 2000

[54] TRANSMISSION POWER CONTROL METHOD IN ASYMMETRIC DIGITAL SUBSCRIBER LINE SYSTEM

[75] Inventor: Jae-Kwan Ryoo, Suwon-shi, Rep. of Korea

[73] Assignee: Samsung Electronics Co., Ltd., Kyungki-Do, Rep. of Korea

[21] Appl. No.: 09/106,907

[22] Filed: Jun. 30, 1998

[30] Foreign Application Priority Data

Aug. 30, 1997 [KR] Rep. of Korea ........................ 97/43739

[51] Int. Cl.[7] ........................................................ H04M 1/24
[52] U.S. Cl. .............................. 379/1; 379/28; 379/413
[58] Field of Search ................................. 379/1, 23, 24, 379/27, 28, 29, 32, 93.36, 322, 323, 324, 413; 375/227, 228; 455/13.4

[56] References Cited

U.S. PATENT DOCUMENTS

| | | | |
|---|---|---|---|
| 4,625,077 | 11/1986 | Biffle et al. ................................. | 379/28 |
| 5,063,563 | 11/1991 | Ikeda et al. ............................. | 370/110.1 |
| 5,768,684 | 6/1998 | Grubb et al. ............................. | 455/13.4 |
| 5,815,798 | 9/1998 | Bhagalia et al. ........................ | 455/13.4 |

*Primary Examiner*—Curtis A. Kuntz
*Assistant Examiner*—Binh K. Tieu
*Attorney, Agent, or Firm*—Sughrue, Mion, Zinn, Macpeak & Seas, PLLC

[57] ABSTRACT

A transmission power control method in an Asymmetric Digital Subscriber Line (ADSL) system for transmitting data through a telephone line interposed between an ADSL-TUC (Transmission Unit Center) and an ADSL-TUR (Transmission Unit Remote). The ADSL system compares a noise margin with a reference value and reduces a transmission power level of a transmission signal step-by-step, beginning from an initial maximum power level. When the transmission power level is reduced to the point that the noise margin no longer exceeds the reference value, the transmission power level is then restored to a level just high enough that the noise margin is greater than the reference value. As a result crosstalk is minimized while permitting optimum data transmission rates and saving transmission power.

11 Claims, 2 Drawing Sheets

TRANSMISSION POWER CONTROL METHOD IN ASYMMETRIC DIGITAL SUBSCRIBER LINE SYSTEM

BACKGROUND OF THE INVENTION

1. Field of the Invention

The present invention relates to an asymmetric digital subscriber line (ADSL) system, and in particular, to a method for controlling transmission power in an asymmetric digital subscriber line system.

2. Description of the Related Art

In general, an asymmetric digital subscriber line (hereinafter referred to as an ADSL) system transmits a signal at a predetermined fixed transmission power level, when transmitting data through a telephone line interconnected between an ADSL-TUC (Transmission Unit Center) and an ADSL-TUR (Transmission Unit Remote). Preferably, the transmission power level should be sufficiently high so as to maintain the preferred data transfer rate in consideration of an S/N (signal-to-noise) ratio due to attenuation of the signal. On the other hand, the transmission power level should be sufficiently low so as to reduce any influence due to crosstalk between the subscriber lines, wherein the crosstalk is proportional to the transmission power level.

Conventionally, in the light of the foregoing, the transmission power level in an ADSL system has been set at a fixed, appropriate power level. Unfortunately, this results in inflexibility in improving the transmission capability. In reality, the telephone lines of the respective subscribers may have different conditions of noise, attenuation, and crosstalk susceptibility. Nevertheless, the transmission power level has been fixedly set with respect to all the subscriber lines, so that in some cases, the fixed transmission power level may be lower or higher than an appropriate power transmission level which may be different depending on the subscriber lines. As a result, the system may be influenced by crosstalk. In order to reduce the negative affects of the crosstalk, the data transfer rate must be lowered. This results in a decrease of the transmission capability and an unnecessary waste of transmission power.

SUMMARY OF THE INVENTION

It is therefore an object of the present invention to provide a transmission power control method capable of improving the data transmission capability in an ADSL system.

It is another object of the present invention to provide a transmission power control method capable of saving transmission power in an ADSL system.

To achieve the above objects, a transmission power control method in an ADSL system is provided for transmitting data through a telephone line interposed between an ADSL-TUC and an ADSL-TUR. The ADSL system compares a measured noise margin with a reference value, changes a transmission power level of a transmission signal, step-by-step, beginning from an initial level, and sets the transmission power level to a minimum level as long as the measured noise margin is greater than the reference value.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE PREFERRED EMBODIMENT

Figure 1:
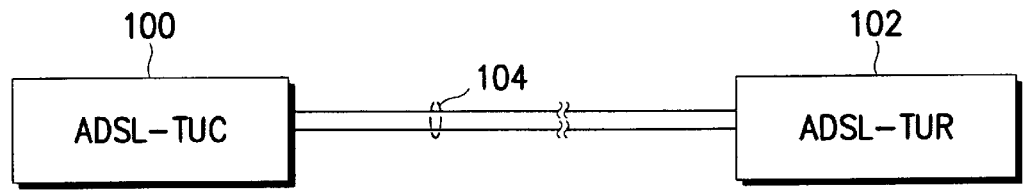
FIG. 1 is a schematic block diagram of a general ADSL system.

A preferred embodiment of the present invention will be described in detail referring to the attached drawings. To aid understanding, like reference numerals denote the same elements in the drawings. Though a specific exemplary embodiment is described in detail herein, such as the detailed flow chart of FIG. 3, so as to clarify the subject matter of the present invention, the present invention may be implemented by those skilled in the art, based upon the description of the present invention, but without particular described details. In addition, an unnecessarily detailed description of widely known functions and constructions will be avoided.

FIG. 1 is a schematic block diagram of a common ADSL system to which the present invention is applicable. The illustrated ADSL system transmits data by using an ADSL through a telephone line 104 interconnected between an ADSL-TUC 100 and an ADSL-TUR 102. A detailed block diagram of the ADSL-TUC 100 is illustrated in FIG. 2.

Figure 2:
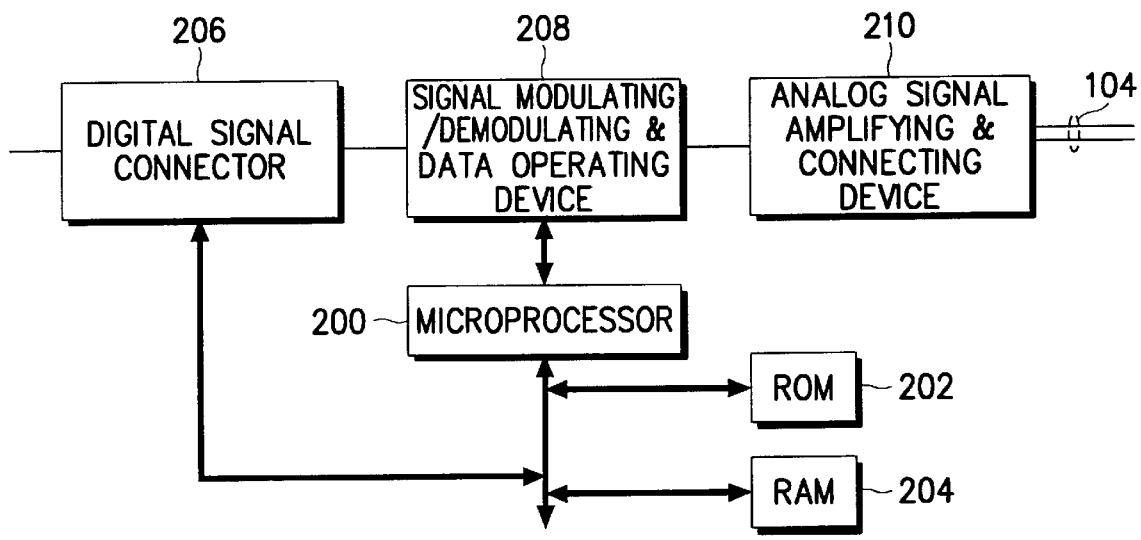
FIG. 2 is a detailed block diagram of an ADSL-TUC (100) of FIG. 1.

Referring to FIG. 2, a digital signal connector 206 connects a digital transmission signal, to transmit and receive data through the telephone line 104. An analog signal amplifying and connecting device 210 is connected between a signal modulating/demodulating and data operating device 208 (which functions to modulate and demodulate the digital transmission signal) and the telephone line 104 (which functions to transmit the modulated signal), so that the signal may be transmitted and received. A microprocessor 200 controls an overall operation of the ADSL-TUC 100. A ROM (Read Only Memory) 202 stores an operation program of the microprocessor 200, and a RAM (Random Access Memory) 204 temporarily stores data generated in the process of executing the operation program.

The ADSL system is initialized, in case the ADSL-TUC 100 is successively powered off and on, or in case the communication between the ADSL-TUC 100 and the ADSL-TUR 102 is successively shut off and recovered due to trouble of the telephone line 104. The initialization is performed depending on the status of the subscriber line, by interlocking a MODEM of the ADSL-TUC 100 in the telephone office with a MODEM the ADSL-TUR 102 in the subscriber's house. Specifically, the system is initialized such that the data transfer rate is set to an optimal condition according to the S/N ratio of the respective subscriber loops, and an optimal bit allocation is performed according to the operating frequency band.

In general, the above mentioned initialization process is widely divided into three steps. A first step is a fundamental communication enabling step in which the signal modulating/demodulating and data operating device 208 of the ADSL-TUC 100 transmits a test signal to the ADSL-TUR 102 to enable the fundamental communication. A second step is a sub-channel analyzing step in which the ADSL-TUC 100 analyzes (i.e., measures) noises and signal attenuations of 248 sub-channels which are obtained by dividing an operating frequency band 30–1104 kHz of the transmitter into 4.3125 kHz wide sub-channels, and allocates 0–15 data bits to be transmitted to the respective sub-channels by using the analysis results to determine the bit rate. A third step is a step of exchanging the analysis result and connecting for transmitting such allocated contents to the ADSL-TUR 102 and then, starting a normal communication.

Therefore, in case the ADSL-TUC 100 is successively powered off and on, or in case the communication between the ADSL-TUC 100 and the ADSL-TUR 102 is successively shut off and recovered due to trouble of the telephone line 104, the ADSL system is initialized in the manner described above so as to provide a normal communication service.

The present invention is directed to optimizing the transmission power during the initialization process.

Figure 3:
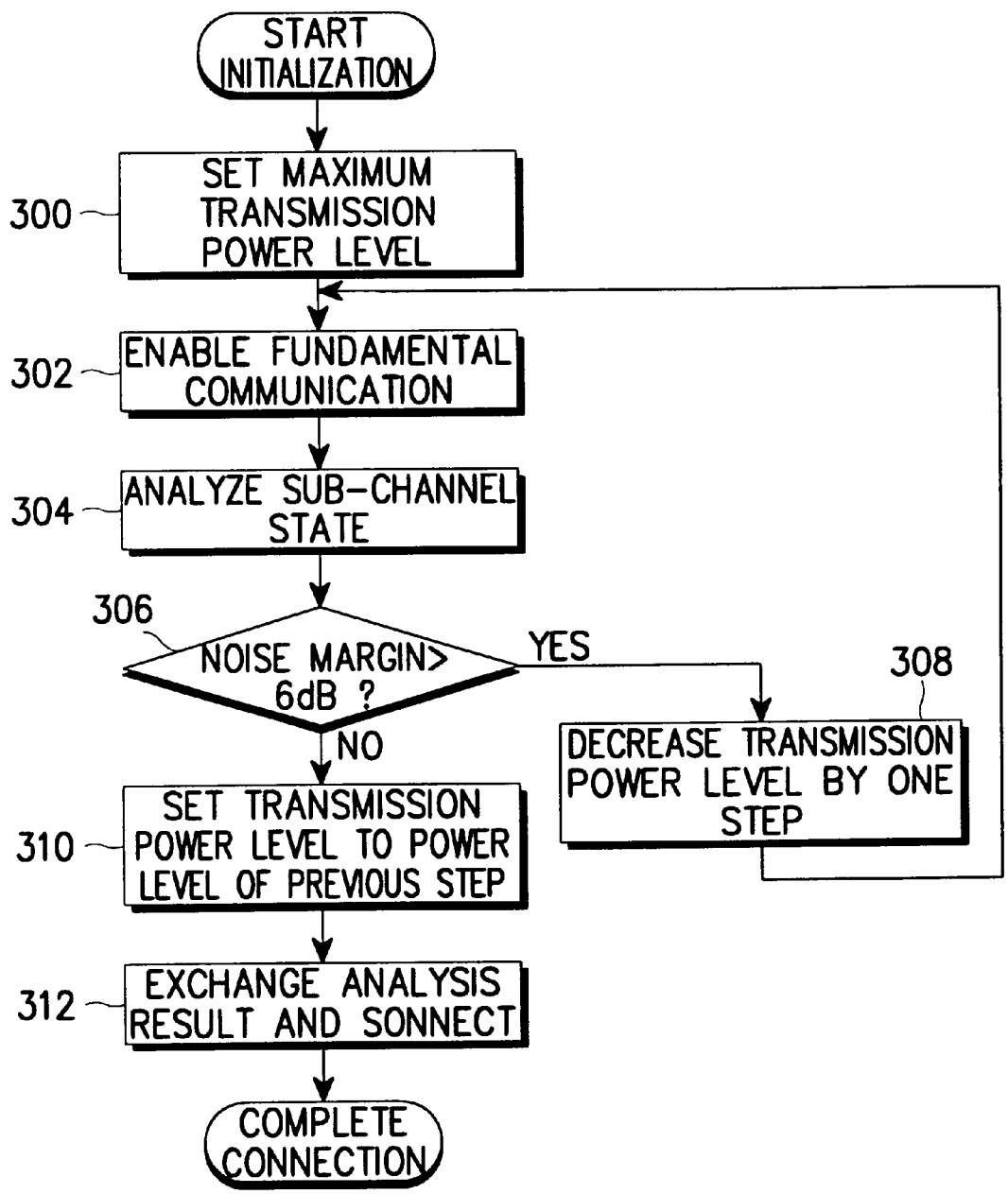
FIG. 3 is a flowchart for controlling the transmission power according to an embodiment of the present invention.

FIG. 3 is a flowchart for controlling the transmission power according to a preferred embodiment of the present invention, which further includes a transmission power control process in addition to the above initialization process. The control flow shown in FIG. 3 is programmed into the ROM 202 and performed by the microprocessor 200.

Referring to FIGS. 1 through 3, the preferred embodiment of the present invention is described as follows. First, upon starting the initialization, the microprocessor 200 sets the transmission power level to the maximum level, at step 300 of FIG. 3. Then, the microprocessor 200 causes the test signal to be transmitted, as described above, to enable the fundamental communication at step 302, and analyzes the sub-channel state according to enabling of the fundamental channel to determine the bit rate, at step 304. It is checked at step 306 whether a noise margin is greater than a reference value, e.g., 6 dB.

If the noise margin is greater than 6 dB, the microprocessor 200 reduces the transmission power level by one step, so as to experimentally determine whether the transmission power level may be reduced further. After reducing the transmission power level one step, the microprocessor 200 returns to step 302 to repeat the procedure beginning at the fundamental communication enabling process. If the noise margin becomes less than 6 dB through the repetitive reduction of the transmission power level, the method branches from step 306 to step 310 and the microprocessor 200 sets the transmission power level one step higher, i.e., to the power level of the previous power test loop. When the method branches from step 306 to step 310, it is determined that the transmission power level should not be reduced further and is returned to the lowest power level at which the noise margin exceeded the 6 dB reference level.

Thereafter, at step 312, the microprocessor 200 transmits the initialization results to the ADSL-TUR 102, and starts the normal communication.

Therefore, it is possible to minimize the influence due to crosstalk between the various subscriber lines, while at the same time saving transmission power, by not only variably setting the transmission bit rate depending on the S/N ratio according to the length of the subscriber line, but also by reducing the transmission power level to an optimal level within the limit where the transfer rate determined according to the S/N ratio can be maintained normally. Further, the data transmission capability may be improved, if the ADSL system transmits the data with the maximum transmission power specified by an international standard, with respect to a subscriber loop having a poor S/N ratio due to signal attenuation of the subscriber line.

As described above, the embodiment of the present invention adaptively controls the transmission power level according to the line characteristic, so that the data transmission capability may be improved and power may be saved.

Although an illustrative embodiment of the present invention has been described herein with reference to the accompanying drawings, it is to be understood that the invention is not limited to the precise described embodiment, and that various other changes and modifications may be affected therein by one skilled in the art without departing from the scope or spirit of the invention.

What is claimed is:

1. A transmission power control method for use in a system for transmitting data via a telephone line by using an asymmetric digital subscriber line, wherein the telephone line is interposed between a central transmission unit and a remote transmission unit, the method comprising the steps of:

(a) comparing a measured noise margin in a sub-channel of said asymmetric digital subscriber line with a reference value, and changing a transmission power level of a signal transmitted through said sub-channel in a step-by-step manner, beginning at an initial power level; and (b) setting the transmission power level to obtain a power level which causes said noise margin to be lower than said reference value, while still providing enough power to transmit data along said sub-channel.

2. The transmission power control method as claimed in claim 1, wherein in said step (a) the changing of the transmission power level in a step-by-step manner is begun at said initial level which is a predetermined maximum power level.

3. The transmission power control method as claimed in claim 1, wherein said reference value is 6 dB.

4. The transmission power control method as claimed in claim 1, wherein data is transmitted between said central transmission unit and said remote transmission unit at the transmission power level set in said step (b).

5. The transmission power control method of claim 1, wherein the central transmission unit is an ADSL-TUC and the remote transmission unit is an ADSL-TUR.

6. A transmission power control method, for use in a system for transmitting data by using an asymmetric digital subscriber line via a telephone line interposed between a central transmission unit and a remote transmission unit, the method comprising the steps of:

(a) setting a transmission power level of a signal transmitted through said telephone line to a maximum level;

(b) transmitting a test signal with said set transmission power level to enable a fundamental communication;

(c) analyzing a sub-channel state according to said fundamental communication to determine a bit rate, and comparing an analyzed noise margin with a reference value;

(d) in the event the comparison in said step (c) shows that said noise margin is greater than said reference value, decreasing said transmission power level by one power interval and returning to said step (b); and (e) in the event the comparison in said step (c) shows that said noise margin is less than said reference value, setting said transmission power level to a transmission power level according to a previous step.

7. The transmission power control method as claimed in claim 6, wherein said reference value is 6 dB.

8. The transmission power control method as claimed in claim 6, wherein in said step (e) said transmission power is increased by one power level.

9. The transmission power control method as claimed in claim 6, wherein in said step (e) said transmission power is restored to a power level prior to the most recent return to said step (b).

10. The transmission power control method as claimed in claim 6, wherein the data is transmitted between said central transmission unit and said remote transmission unit at the transmission power level set in said step (e).

11. The transmission power control method of claim 6, wherein the central transmission unit is an ADSL-TUC and the remote transmission unit is an ADSL-TUR.

* * * * *